July 2, 1963
P. LUGINBUHL
3,095,960
DEVICE FOR ARRANGING IRREGULARLY SUPPLIED FLAT ARTICLES
Filed Nov. 10, 1960
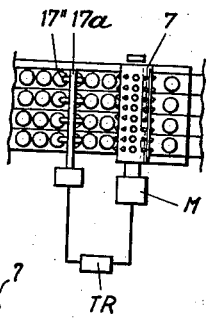
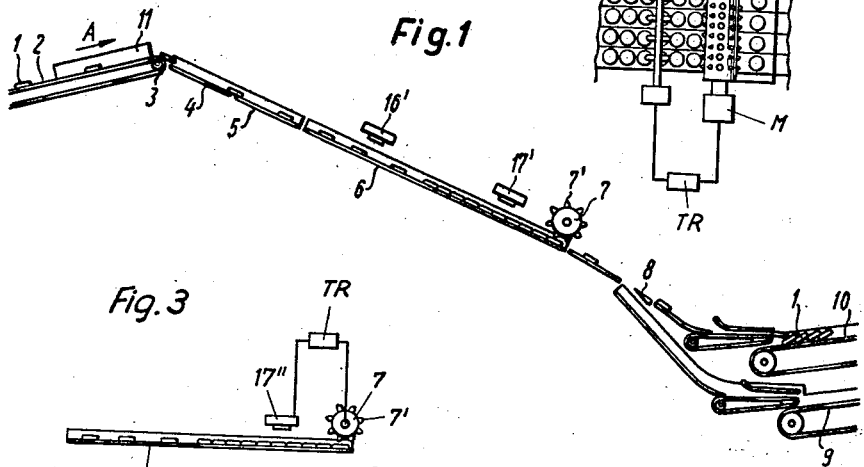
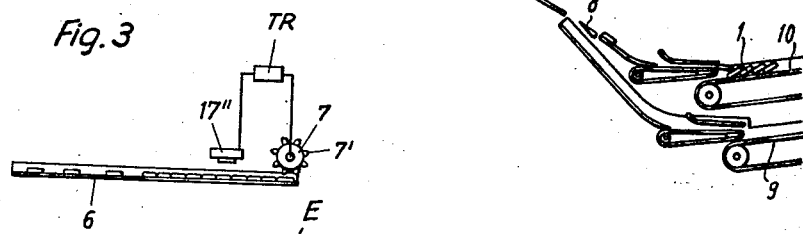
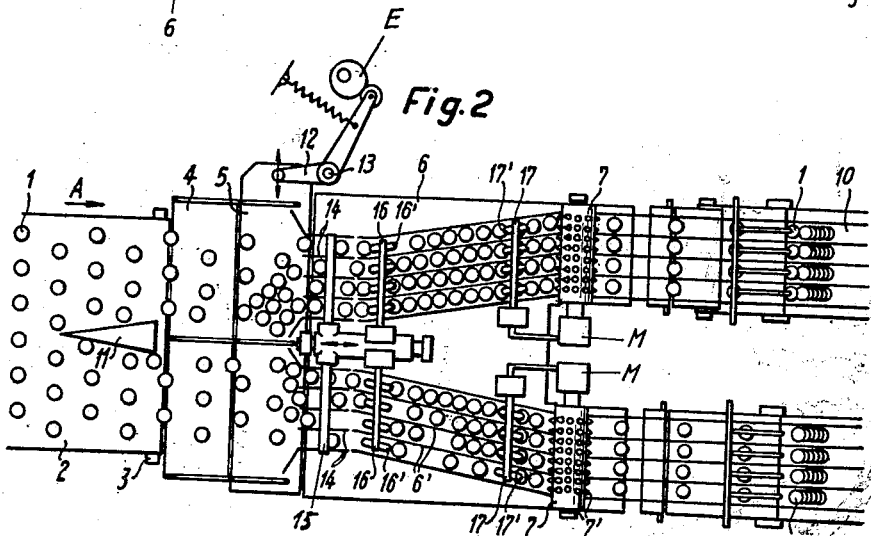

United States Patent Office 3,095,960
Patented July 2, 1963

3,095,960
DEVICE FOR ARRANGING IRREGULARLY SUPPLIED FLAT ARTICLES
Pierre Luginbühl, Neuhausen am Rheinfall, Switzerland, assignor to Schweizerische Industrie-Gesellschaft, Neuhausen am Rheinfall, Switzerland
Filed Nov. 10, 1960, Ser. No. 68,393
Claims priority, application Switzerland Nov. 20, 1959
6 Claims. (Cl. 198—30)

The present invention relates to a device for arranging irregularly supplied flat articles, particularly biscuits, in a line, and has the primary object of providing means for passing on such articles in an orderly manner and without interruption of the said line to processing machines such as wrapping machines.

With this and other objects in view as will become apparent later from this specification and accompanying drawings, I provide a device of the kind referred to comprising in combination: at least one inclined slide track having channels in which said articles slide down under the action of gravity, a delivery drum having teeth engaging in said slide track between consecutive articles and controlling their movement along said channels, driving means operatively connected to said delivery drum, and sensing control means responsive to the articles sliding down said slide track and operatively connected to the said driving means in the sense of permitting rotation of said delivery drum only responsive to the sensing of all said channels being filled without gaps with articles up to a predetermined level.

These and other features of my invention will be clearly understood from the following description of an embodiment thereof given hereinafter by way of example with reference to the accompanying drawing, in which:

FIG. 1 is a side elevation of part of the conveyer device for biscuits to a wrapping machine, having a delivery device with two groups of channels, FIG. 2 is a plan view of the device according to FIG. 1.

FIG. 3 illustrates a side elevation view of a single control unit employed in a modified device, and FIG. 4 illustrates a top plan view of the control unit shown in FIG. 3.

The biscuits 1 are conveyed in the direction of arrow A from a working station, e.g. a stove through which they pass, on a conveyer belt 2, which runs over a deflector roller 3. An inclined intermediate floor 4 joins the conveyer belt 2 followed by a so-called one-track floor 5. The latter is followed by the slide track 6 of the discharging device, at the lower end of which the delivery drums 7 are arranged. The latter are followed by switch-over points 8, which in their working position establish connection to the conveyer belts 10.

The floors 4, 5 and the slide track 6 are sloped in such a way that the biscuits 1 slide downward towards the delivery drums 7 under the action of gravity. The slide track 6 in the embodiment illustrated is divided into two part-tracks, each of which is provided with a separately working delivery drum 7.

Obviously a single slide track or a plurality of part-tracks could alternatively be provided. Each part-track is subdivided in the direction of conveying by vertical fences 6' into four downwardly converging channels the width at the lower ends of which is only a little larger than the diameter of the biscuits. The latter are thereby forced to slide down the said channels in single file. In order that the incoming biscuits may be uniformly distributed over both part-tracks, a wedge-shaped distributor piece 11 is arranged at the end of the conveyer belt 2. In order to prevent jamming at the entry of the biscuits into the individual channels an oscillating movement transversely of the direction of conveying of the biscuits is imparted to the one-track floor 5, which is effected in a known manner, for example from an eccentric E through the pivot 13 and the lever 12. At the entry of the slide track 6 more-over so-called single-track laminations 14 are arranged, the spacing of which corresponds to the width of the individual channels at their entry. These single-track laminations are fixed to a bar 15, which performs an oscillating movement in the direction of conveying of the biscuits 1.

Above the two part-tracks 6 control eyes in the form of straight rows of photo-electric cells 16' and 17' known as such, and mounted on common supports 16 and 17, respectively, are uniformly distributed over the individual channels, which control eyes act in a manner likewise known in itself on the driving motors M of the delivery rollers 7 and of the conveyer belt 10. The delivery drums 7 are provided with parallel rows of pins 7' the pitch of which is so dimensioned that any two pins of two consecutive rows may engage within any channel of the slide tracks into the gaps between the round biscuits without damaging the same, when the biscuits contact one another, i.e. when they follow one another closely on the slide track. The pins 7' engage into the said gaps in such a manner that the biscuits can run past under the delivery roller when the latter rotates. There exists therefore a safeguard that upon rotation of the delivery drum always the same number of biscuits is passed on, sluice-fashion, from all the associated channels.

The manner of operation of the device is as follows:

The biscuits 1 entering upon the conveyer belt 2 are distributed by the distributor piece 11 approximately equally over both halves of the intermediate floor. Since the latter is inclined, they run on the one-track floor 5 towards the one-track laminations 14 and between and past the same into the individual channels of the slide tracks 6. The two oscillations of the single-track floor 5 and of the single-track laminations 14 directed towards one another in this operation prevent a jamming and damming up of the biscuits. As long as the delivery drum 7 is at a standstill, the biscuits are dammed up in the corresponding channels of the slide tracks. This condition continues until the rows of biscuits extend in all the channels up to a point below the upper photo-electric cells 16'. At this moment the latter cause the drive of the delivery drum 7 and of the conveyer belt 10 to become operative, and the biscuits are moved along by the rotation of the drum and get over the points 8 on to the belt 10, which carries them away. The delivery drums 7 and the conveyer belt 10 remain in operation until no more biscuits are present in at least one of the channels of the corresponding part-track in the lower range thereof, i.e. below the photo-electric cells 17'. At this moment the photo-electric cells 17' switch the drive of the delivery drums off. As soon as in all channels biscuits are again present up to a point below the photo-electric cells 16', the latter cause the drive of the delivery drum to become operative again. By this device accordingly a rotation of the delivery drum is prevented unless biscuits are present in all the channels. Thereby difficulties are obviated in the subsequent processing machine which requires a uniform feed from all the channels of a part-track.

In the embodiment illustrated and described of the device according to the invention two control units are built-in above the individual channels at a certain spacing from one another, which switch the movement of the delivery drum on and off depending on the state of the biscuits in the channels. This control could however be effected just as well by a single control unit 17a, 17'' (FIGS. 3 and 4), which brings the delivery drum 7 to a standstill any time an insufficient filling of a channel occurs in combination with a delayed action switch TR, which after the lapse of a certain time interval sets the same into motion again, provided the required conditions otherwise prevail.

In the modification described the control units comprise photo-electric cells which in combination with emitter lamps superintend the filling of the channels. This supervision could however be effected just as well by any other suitable means.

In the drawing the different delivery drums have individual drives. It is clear that without difficulty alternatively a common drive for all drums would be possible, the latter then being controlled by the use of clutches, which are associated with the individual drums and are suitably adjusted by the control units.

While I have herein described and illustrated in the accompanying drawing what may be considered typical and particularly useful embodiments of my said invention and I wish it to be understood that I do not limit myself to the particular details and dimensions illustrated and described; for obvious modifications will occur to a person skilled in the art.

What I claim as my invention and desire to secure by Letters Patent is:

1. In apparatus for aligning irregularly supplied flat objects, particularly biscuits, and advancing said objects in the aligned order, means defining at least one track having a supply end and a delivery end and being inclined sufficiently to cause said objects to slide by gravity from said supply end to said delivery end, means on said track defining channels extending substantially from said supply end to said delivery end and each having a width slightly in excess of the maximum dimension of one of said objects measured parallel with said track, a delivery drum rotatably mounted adjacent to the delivery end of said track and extending across all of said channels, a plurality of rows of substantially radial pins on said drum of sufficient length to extend into said channels and spaced circumferentially in the region of each channel a distance substantially equal to said maximum dimension of the objects, drive means for said delivery drum, and control means including means for sensing a gap between any two successive objects in any one of said rows of aligned objects in said channels and for stopping said drive means in response to the sensing of such a gap, said control means includes a delayed action switch in the electric circuit of said drive means adapted to close automatically and restart the drive means after a predetermined time interval following the stopping of said drive means.

2. In apparatus for aligning irregularly supplied flat objects, particularly biscuits, and advancing said objects in the aligned order, means defining a track inclined from a supply end to a delivery end thereof sufficiently to cause said objects to slide by gravity thereon from said supply end to said delivery end, means on said track defining a plurality of channels extending substantially from said supply end to said delivery end of the track, each of said channels having a width sufficient to accommodate one of said objects with a slight lateral clearance, rotary means extending across said plurality of channels adjacent to said delivery end of the track and having its axis of rotation substantially transverse to said channels, a plurality of substantially radial pins on said rotary means arranged in separate circumferential rows coinciding with said channels and having such a length and circumferential spacing as to successively extend into said channels into engagement with consecutive ones of said objects therein as rotary means rotates, whereby upon cessation of the rotation of said rotary means advance of the objects in the channels past said engaging pins is prevented, drive means for said rotary means, first control means disposed in the lower range of said track and including means for sensing a gap in any one of said rows of aligned objects in said channels and for stopping said drive means in response to the sensing of such a gap, and second control means adapted to restart said drive means following said stopping thereof, whereby delivery of said objects from said track is automatically interrupted when any of said channels is devoid of a row of interengaging objects, and automatically resumed when said void has been filled, said second control means being disposed in a higher range of said track than said first control means and including sensing means for sensing the presence of one of said objects at rest in each of said channels and for starting said drive means in response to the sensing of such presence.

3. The apparatus as set forth in claim 2, in which said second control means comprises photoelectric cells, and switch means in the electric circuit of said drive means operatively connected with said photoelectric cells.

4. The apparatus as set forth in claim 1, including inclined slide means at the supply end of said track, means for oscillating said slide means transversely of said track, a plurality of laminations forming between them continuations of said channels over the supply end of said track, and means for oscillating said laminations longitudinally of said track.

5. In apparatus for aligning irregularly supplied flat objects, particularly biscuits, and advancing said objects in the aligned order, means defining at least one track having a supply end and a delivery end and being inclined sufficiently to cause said objects to slide by gravity from said supply end to said delivery end, means on said track defining channels extending substantially from said supply end to said delivery end and each having a width slightly in excess of the maximum dimension of one of said objects measured parallel with said track, a delivery drum rotatably mounted adjacent to the delivery end of said track and extending across all of said channels, a plurality of rows of substantially radial pins on said drum of sufficient length to extend into said channels and spaced circumferentially in the region of each channel and a distance substantailly equal to said maximum dimension of the objects, drive means for said delivery drum, and control means including means for sensing a gap between any two successive objects in any one of said rows of aligned objects in said channels and for stopping said drive means in response to the sensing of such a gap, said control means also including a delayed action switch in the electric circuit of said drive means adapted to close automatically after a predetermined time interval following the stopping of said drive means, and inclined slide means at the supply end of said track, means for oscillating said slide means transversely of said track, a plurality of laminations forming between them continuations of said channels over the supply end of said track, and means for oscillating said laminations longitudinally of said track.

6. In apparatus for aligning irregularly supplied flat objects, particularly biscuits, and advancing said objects in the aligned order, means defining a track inclined from a supply end to a delivery end thereof sufficiently to cause said objects to slide by gravity thereon from said supply end to said delivery end, means on said track defining a plurality of channels extending substantially from said supply end to said delivery end of the track, each of said channels having a width sufficient to accommodate one of said objects with a slight lateral clearance, rotary means extending across said plurality of channels adjacent to said delivery end of the track and having its axis of rotation substantially transverse to said channels, a plurality of substantially radial pins on said rotary means arranged in separate circumferential rows coinciding with said channels and having such a length and circumferential spacing as to successively extend into said channels into engagement with consecutive ones of said objects therein as said rotary means rotates, whereby upon cessation of the rotation of said rotary means advance of the objects in the channels past said engaging pins is prevented, drive means for said rotary means, first control means disposed in the lower range of said track and including means for sensing a gap in any one of said rows of aligned objects in said channels and for stopping said drive means in response to the sensing of such a gap, and second control means adapted to restart said drive means following said stopping thereof, whereby delivery of said objects from said track is automatically interrupted when any of said channels is devoid of a row of interengaging objects, and automatically resumed when said void has been filled, said second control means being disposed in a higher range of said track than said first control means and includes sensing means for sensing the presence of one of said objects at rest in each of said channels and for starting said drive means in response to the sensing of such presence, and inclined slide means at the supply end of said track, means for oscillating said slide means transversely of said track, a plurality of laminations forming between them continuations of said channels over the supply end of said track, and means for oscillating said laminations longitudinally of said track.

References Cited in the file of this patent

UNITED STATES PATENTS

| | | |
|---|---|---|
| 1,941,043 | Meyer | Dec. 26, 1933 |
| 2,571,576 | Hopkins | Oct. 16, 1951 |
| 2,615,555 | Carter | Oct. 28, 1952 |
| 2,792,922 | Malhiot | May 21, 1957 |
| 2,855,740 | Noland | Oct. 14, 1958 |

FOREIGN PATENTS

| | | |
|---|---|---|
| 81,038 | Norway | Nov. 17, 1952 |